(12) United States Patent
Clarke

(10) Patent No.: US 6,199,515 B1
(45) Date of Patent: Mar. 13, 2001

(54) BAFFLES FOR WATER HEATERS

(75) Inventor: Alan Clarke, Norwich (GB)

(73) Assignee: Beatrae Sadia Heating Limited, Norwich (GB)

( * ) Notice: Subject to any disclaimer, the term of this patent is extended or adjusted under 35 U.S.C. 154(b) by 0 days.

(21) Appl. No.: 09/228,398

(22) Filed: Jan. 12, 1999

(30) Foreign Application Priority Data

Jan. 12, 1998 (GB) .................................................. 9800500

(51) Int. Cl.[7] ...................................................... F22B 1/00
(52) U.S. Cl. .......................... 122/4 R; 122/13.01; 122/32
(58) Field of Search .................... 122/13.01, 32, 122/34, 285, 235.17, 293; 392/491, 492, 493, 494; 137/592, 561 A; 239/555, 590.5, 600, 567; 165/174, 159, DIG. 428

(56) References Cited

U.S. PATENT DOCUMENTS 3,807,365 * 4/1974 Lyman et al. ............................ 122/32
3,889,641 * 6/1975 Mayer et al. ............................ 122/32

* cited by examiner

Primary Examiner—Denise L. Ferensic
Assistant Examiner—Jiping Lu
(74) Attorney, Agent, or Firm—Jacobson, Price, Holman & Stern, PLLC

(57) ABSTRACT

A water heater baffle having an inlet and an outlet for the passage of water therethrough, the baffle being arranged to force the water entering the baffle through a labyrinth before exiting the baffle in a direction substantially 90° to its general flow of entry into the baffle.

11 Claims, 5 Drawing Sheets

BAFFLES FOR WATER HEATERS

FIELD OF THE INVENTION

The present invention relates to improvements in water baffle heaters.

BACKGROUND ART KNOWN TO THE APPLICANT

Water heaters are traditionally fitted with a baffle arrangement at the point where the cold water inlet pipe enters the water container to minimise the agitation and subsequent mixing of cold inlet and hot stored water. This baffle can take several forms, but usually relies on altering the direction of the inlet flow. Where the water heater is fed by a high pressure, high flow, cold feed, the velocity of the water entering the water container is often sufficient, despite the presence of a baffle, to cause agitation of the stored water, thus mixing the stored hot water with cold inlet water, reducing the hot water output efficiency of the water heater.

It is the intention of the present invention to alleviate this problem and to also reduce the inlet water velocity to such a level that the flow noise at the inlet of the heater is minimal thereby ensuring quieter running of the heater itself.

BRIEF DESCRIPTION OF THE DRAWINGS

Preferred embodiments of the invention will now be more particularly described, by way of example only, with reference to the accompanying sheets of drawings wherein.

SUMMARY OF THE INVENTION

According to the present invention in its broadest aspect, there is provided a water heater baffle comprising an inlet and an outlet for the passage of water therethrough, characterised in that the baffle arrangement forces the water entering the baffle through a labyrinth before exiting the baffle in a direction substantially 90° to its general flow of entry into the baffle.

Preferably, the aperture for the outlet is greater than the inlet aperture.

More preferably still, the inlet aperture is provided with a water pipe abutment means allowing entry of a water pipe into the baffle only up to the abutment.

Preferably, the baffle is formed from two interlocking units, a base plate, and a top plate.

Preferably, the base plate is provided with a number of apertures to ensure that there is a constant flow of water around the base area of the baffle when it is in use.

Preferably, the labyrinth is so designed to ensure that there are at least two changes of direction of the water flow in one plane prior to the water exiting the outlet.

Preferably, the base plate is provided with a number of feet to enable the base plate to "sit" on the internal floor of the storage heater thereby ensuring that water can flow underneath the base plate once the baffle has been installed.

Preferably, the baffle is circular.

Preferably, a number of the internal baffles are provided with at least one curved portion.

Preferably, the outlet comprises a plurality of openings along the peripheral edge of the baffle.

DESCRIPTION OF THE PREFERRED EMBODIMENTS

Figure 1:
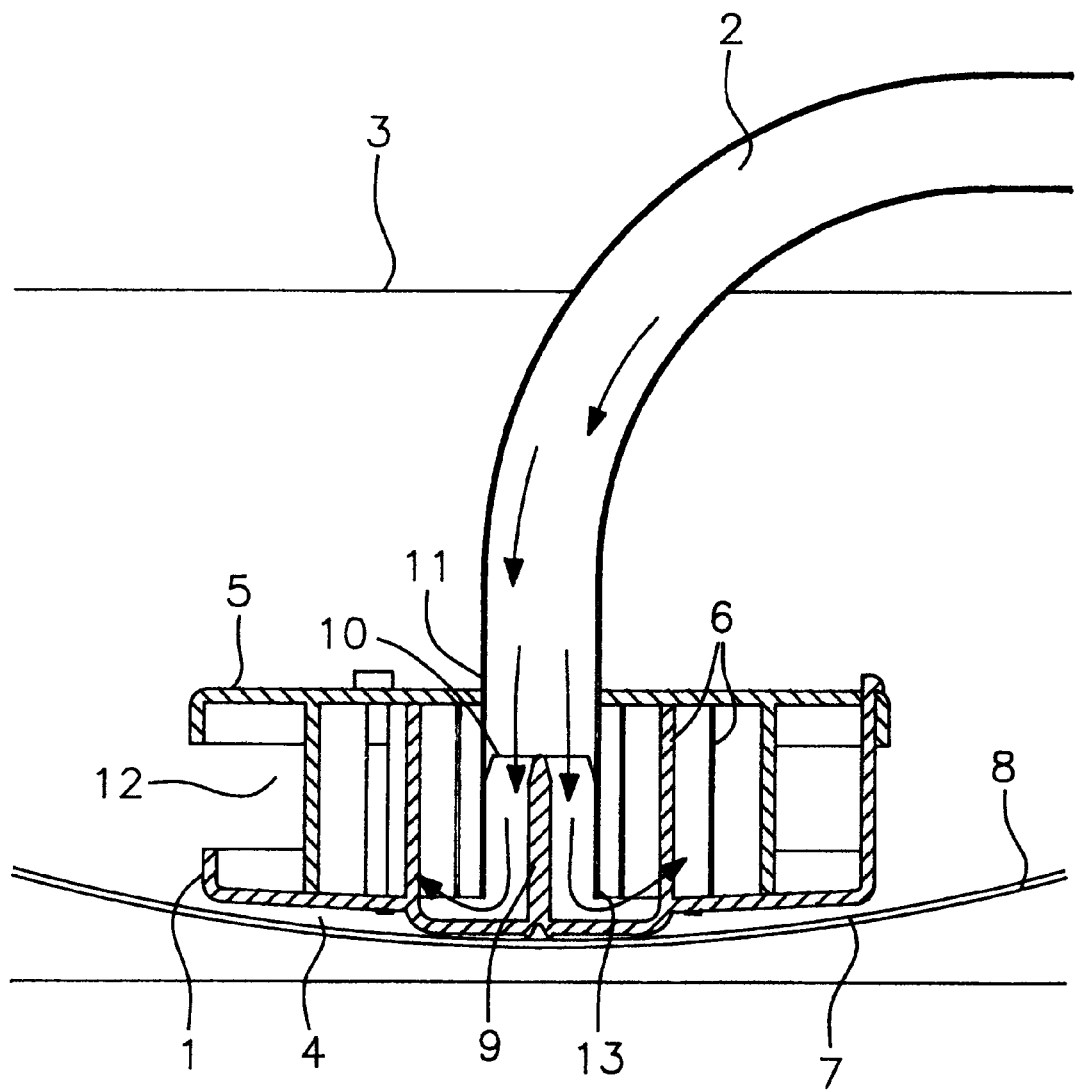
FIG. 1 illustrates a cross-sectional view through the centre of the baffle and through its vertical plane illustrating the flow of water through the baffle.

FIG. 1 illustrates a baffle generally referenced 1 comprising a top plate 5 and a bottom plate 4 that come together in a "snap-fit" arrangement to form a completed baffle 1. FIG. 1 illustrates the baffle 1 seated at tile base of a water storage container 8 via the feet 7, the baffle 1 being submerged below the water line 3 of the storage heater. A water inlet pipe 2 engages the mouth of the inlet 11 of the top plate 5 of the baffle 1 and also engages in a "push-fit" arrangement, the pipe gripper 9, the pipe 2 being guided over the pipe gripper 9 by virtue of the bevelled edges 10 of the pipe gripper 9. The periphery of the pipe then engages the abutment 13 that forms part of the pipe gripper 9, the height of the abutment 13 essentially being sufficient to allow water entering the baffle 1 to pass out through the outlet 12 via the internal baffle plates 6 as shown in FIG. 1

Figure 2:
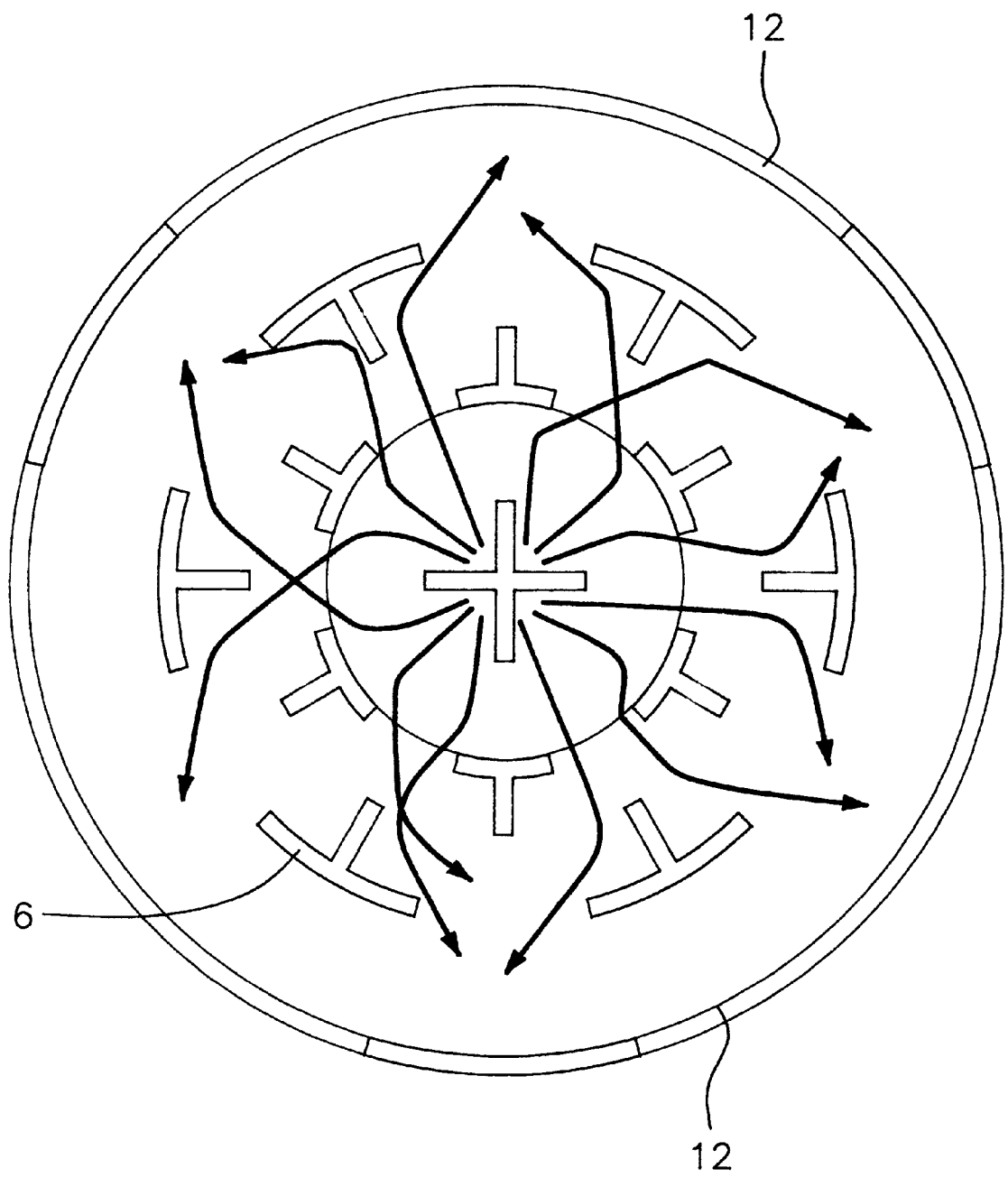
FIG. 2 illustrates a cross-sectional view of the baffle through its horizontal plane.

FIG. 2 illustrates a typical arrangement of internal baffle plates 6 in the completed baffle 1, showing the labyrinth style flow that has to occur once the water moves from a generally vertical direction to a horizontal direction (upon leaving the pipe and entering the baffle) and before exiting the baffle 1 through the aperture 12.

Figure 3:
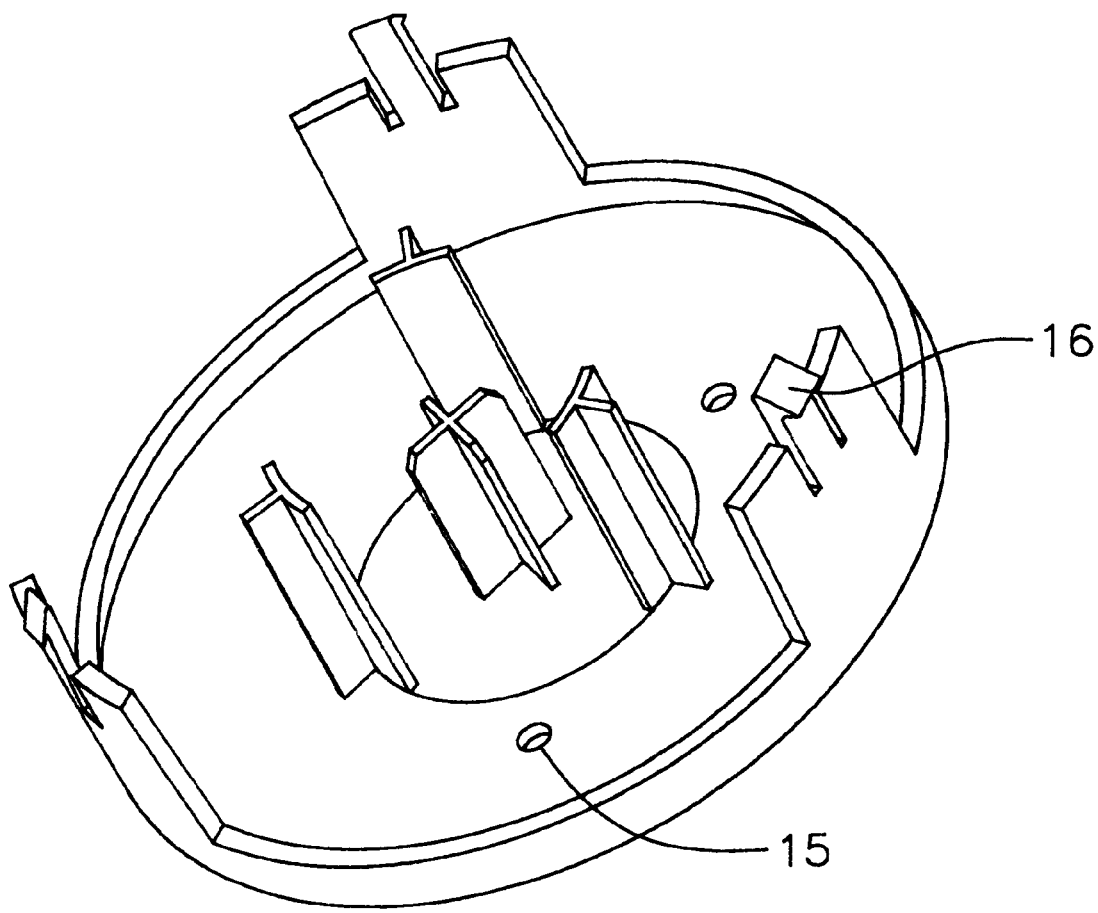
FIG. 3 illustrates a perspective view of the base plate of the baffle.

FIG. 3 illustrates the base plate 4 together with a series of apertures 15 that occur in the base 4 plate to allow the stagnant water below the base plate 4 once the baffle 1 is in use to circulate around the baffle 1 and back into the water system of the storage heater as a result of the feet 7. FIG. 3 also illustrates the male gripping members 16 used to inter-engage with the top plate 5 to form the completed baffle 1.

Figure 4:
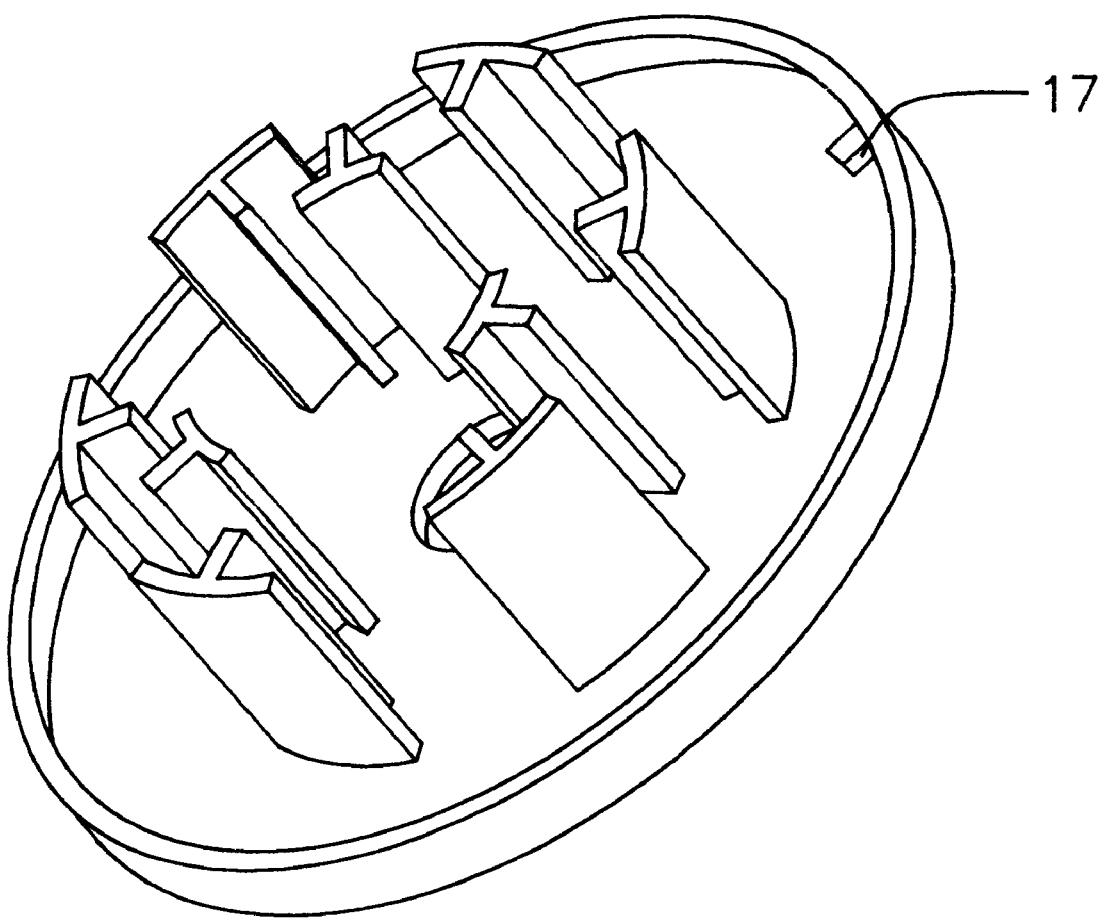
FIG. 4 illustrates a perspective view of the top plate of the baffle.

FIG. 4 illustrates the top plate 5 of the baffle 1 and also shows one of the apertures 17 that inter-engages with the gripping members 16 in a snap-fit to form the completed baffle 1.

For the avoidance of doubt, it will be noted that part of the internal baffle walls 6 are formed on the base plate 4 and on the top plate 5. This is because, approximately the same amount of plastics material is used to form both the top plate 5 and the bottom plate 4 thereby providing cost benefits to the users and designers of the moulds that form both the top and bottom plates of the baffle 1.

The pipe 2 is a standard 22 mm pipe and the plastics material used to manufacture the baffle is preferably polypropylene.

Figure 5:
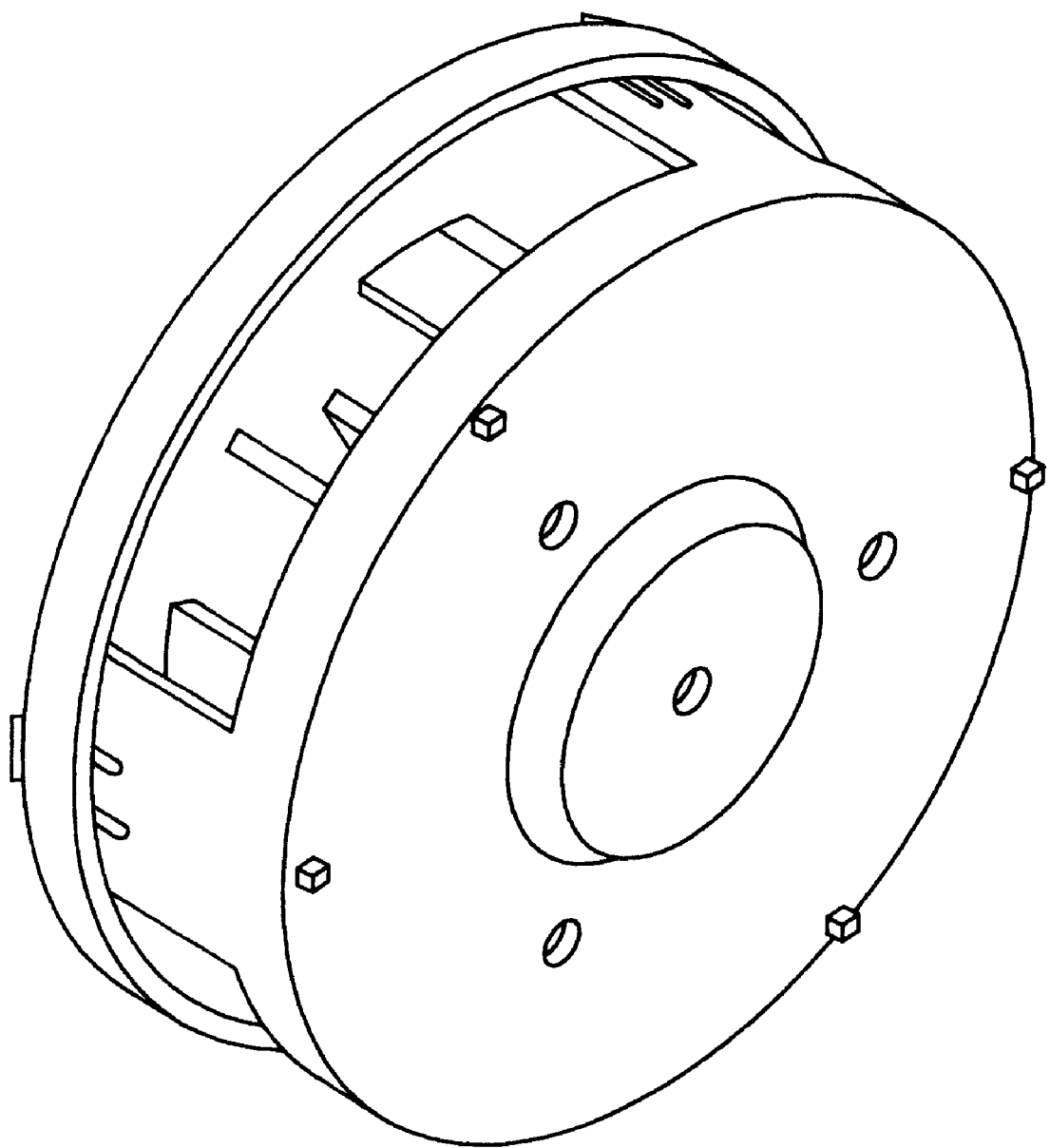
FIG. 5 illustrates a perspective view of the assembled baffle.

FIG. 5 shows the baffle 1 in its completed state with the gripping members 16 inter-engaged with the sockets 17.

All of the internal baffle walls 6 are substantially orthogonal to the main horizontal plane of the baffle 1, at least one part of each respective internal baffle wall being curved.

When the inlet water finally emerges from the baffle 1 its velocity will have been significantly reduced ensuring a minimal amount of turbulence and hence mixing of the cold inlet water with the stored hot water.

What I claim is:

1. A water heater baffle comprising
   a body having an inlet and an outlet for the passage of water therethrough, an inlet flow defector arranged to force water entering the inlet through a labyrinth before exiting the outlet in a direction substantially perpendicular to a substantially axial water flow direction on entry into the inlet, said labyrinth including a plurality of deflector plates arranged to direct deflected water in a substantially radial plane with respect to the substantially axial water flow direction of the entry flow.

2. The water heater baffle of claim 1, wherein the deflector plates comprise a series of concentric discontinuous annular walls defining voids therein for the passage of deflected water.

3. The water heater baffle of claim 2, wherein at least one void in an outermost one of the discontinuous walls defines said outlet so that the outlet is larger than the inlet.

4. The water heater baffle of claim 1, wherein the inlet flow deflector comprises a flow separator which divides water entering the inlet into a number of discrete flow paths for deflection through an acute angle.

5. The water heater baffle of claim 1, wherein the body is formed from two interlocking units, comprising a base plate and a top plate, the base plate carrying said inlet flow deflector and the top plate including said inlet.

6. The water heater baffle of claim 5, wherein the base plate defines a number of minor outlet apertures to ensure a constant flow of water around the outer surface area of the base plate of the body when in use.

7. The water heater baffle of claim 5, wherein the base plate has a number of feet to enable the base plate to sit on an internal curved floor of a storage heater thereby ensuring that water can flow underneath the base plate once the body has been installed.

8. The water heater baffle of claim 1, wherein the labyrinth is profiled to ensure that there are at least two changes of direction of the water flow laterally along the radial plane of the body prior to water exiting the outlet.

9. The water heater baffle of claim 1, wherein the body is substantially cylindrical.

10. The water heater baffle of claim 1, wherein the deflector plates have at least one curved portion.

11. The water heater baffle of claim 1, wherein the outlet comprises a plurality of openings along a peripheral edge of the body.

* * * * *